Aug. 19, 1958     G. PLOGER     2,848,180
AIRPLANE WING

Filed Nov. 23, 1953     3 Sheets-Sheet 1

Gustav Ploger
*INVENTOR.*

BY *[signatures]*
                              *Attorneys*

Aug. 19, 1958     G. PLOGER     2,848,180
AIRPLANE WING
Filed Nov. 23, 1953     3 Sheets-Sheet 3
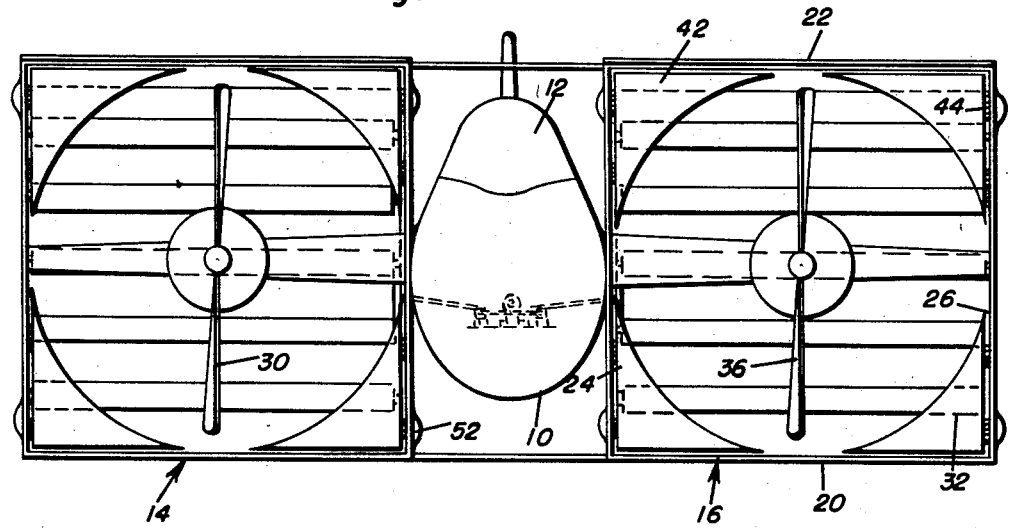
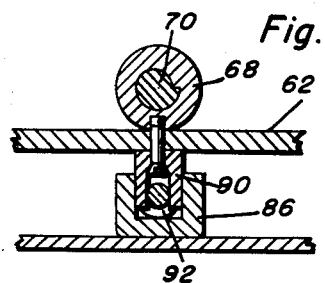
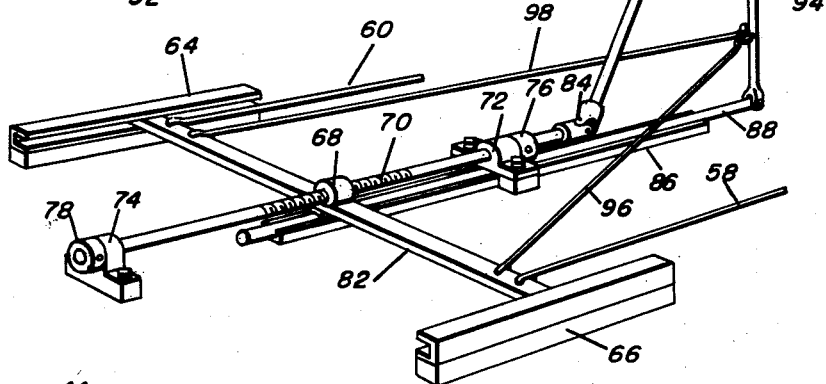
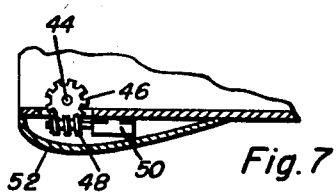
Gustav Ploger
INVENTOR.

United States Patent Office 2,848,180
Patented Aug. 19, 1958

2,848,180

AIRPLANE WING

Gustav Ploger, Cascade, Mont.

Application November 23, 1953, Serial No. 393,560

1 Claim. (Cl. 244—12)

The invention relates to an airplane wing and particularly to a tunnel type wing for improving the operating characteristics of an aircraft.

In the operation of aircraft, it has been customary to provide propellers in the form of air screws and to rotate these propellers to cause forward motion of the aircraft and to utilize laterally extending wings with curved air foil surfaces to provide the desired lift for the craft. These devices have heretofore had certain disadvantages in that a material speed must constantly be maintained in order to provide the lift on the structure and also the devices were incapable of climbing at a steep angle.

In a construction according to the present invention, the wings are provided in the forms of longitudinally extending tunnels mounted on each side of the body of the aircraft and air foils are placed in the tunnels to direct the force thereof so that the aircraft may rise substantially vertically or move in a horizontal direction as may be desired. Further, the air foils in the wings may be adjusted by the operator so that the lift and direction of lift may be controlled and the air foils may be oppositely adjusted so that the craft may turn.

It is accordingly an object of the invention to provide an improved aircraft.

It is a further object of the invention to provide an improved aircraft wing.

It is a further object of the invention to provide an improved air foil control for aircraft.

Other objects and many of the attendant advantages of the present invention will be apparent from the following detailed description taken in conjunction with the accompanying drawing in which:

Figure 3 is a front elevation of the aircraft showing the arrangement of the propeller shrouds in conjunction with the propellers and the air foils;

Figure 4 is a perspective view of the wing angle controller according to the invention;

Figure 6 is a cross-section of the wing angle controller taken substantially on the plane indicated by the section line 6—6 of Figure 5; and Figure 7 is a sectional elevation of a closure operator for the propeller shroud.

Figure 1:
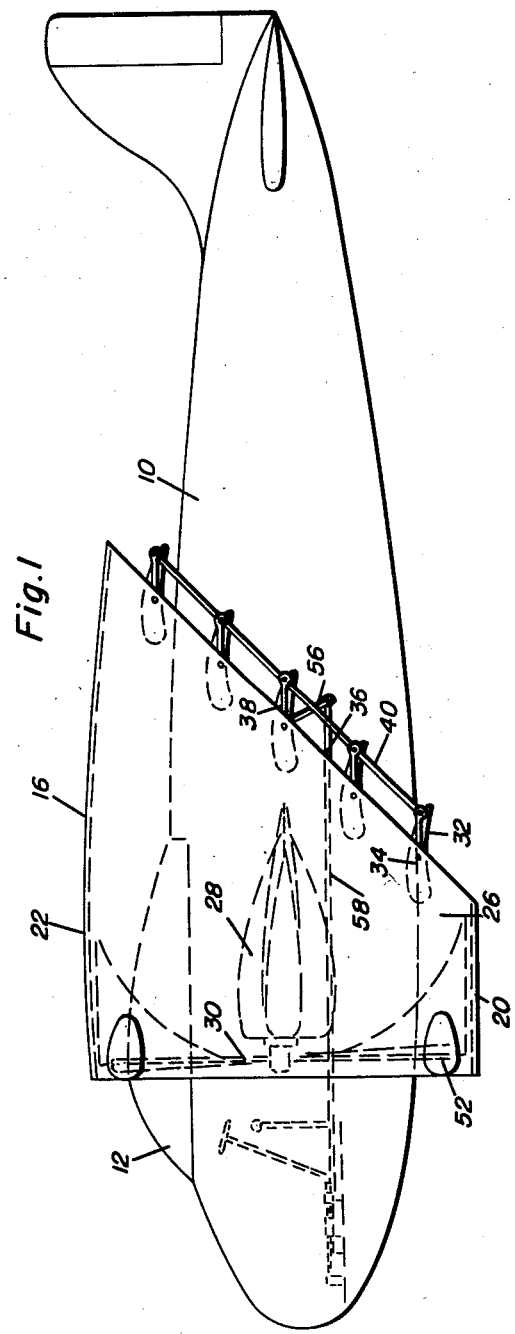
Figure 1 is a side elevation of an aircraft utilizing the improved wing construction according to the invention.
Figure 5:
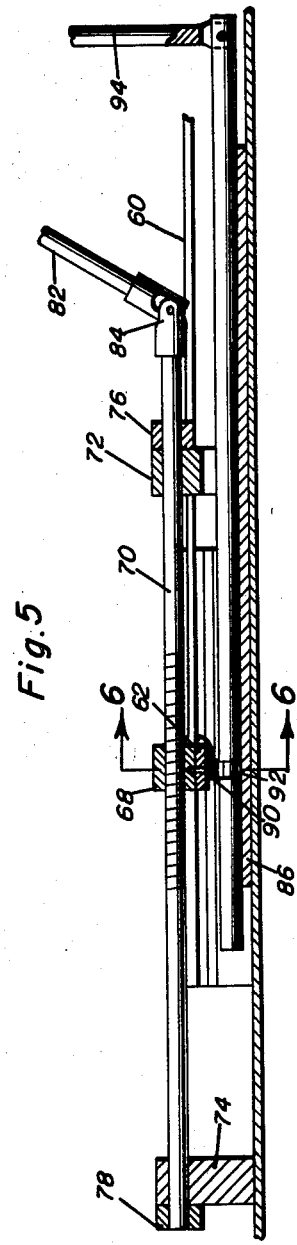
Figure 5 is a sectional elevation view of the wing angle controller.
Figure 2:
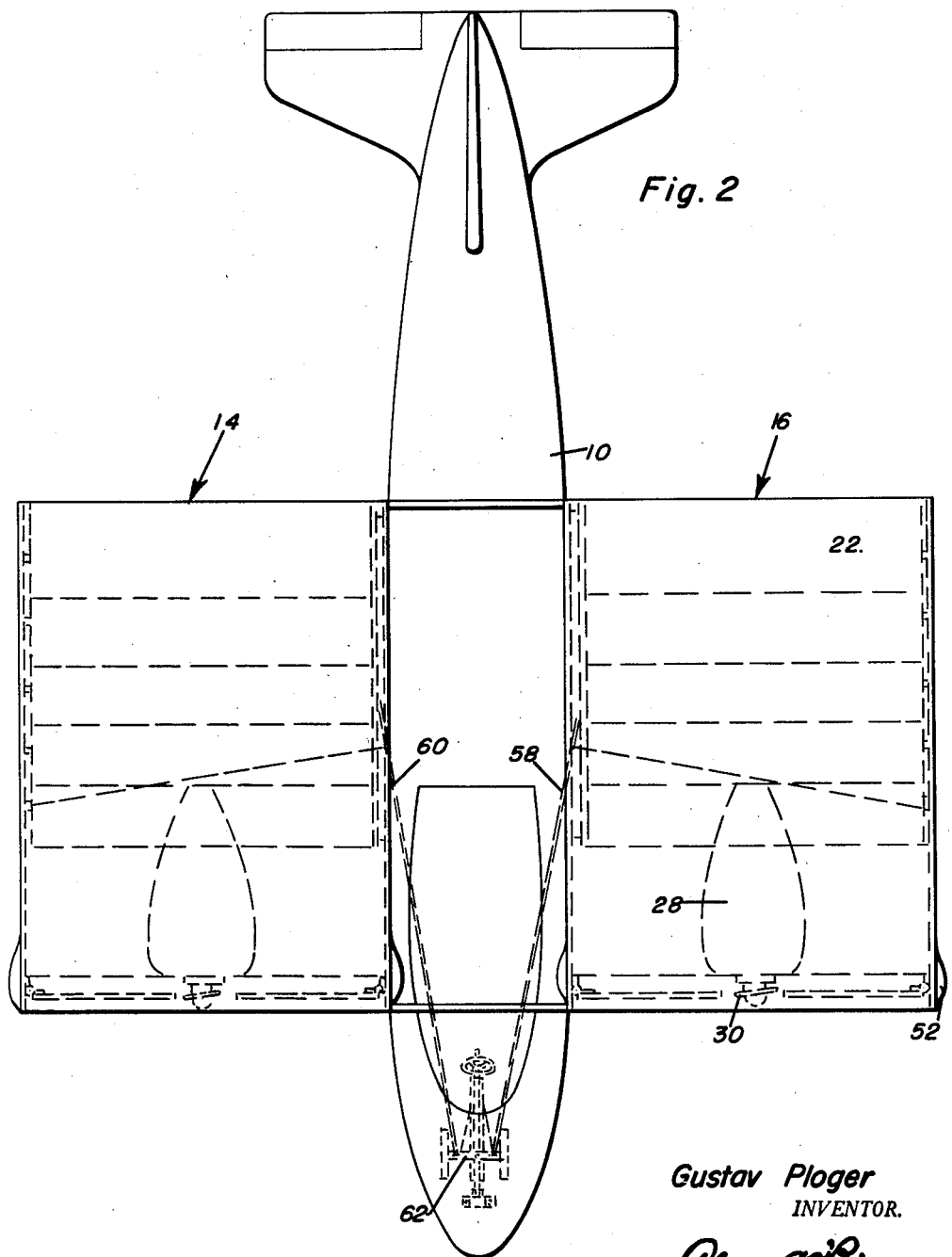
Figure 2 is a top plan view of the aircraft according to the invention.

In the exemplary embodiment according to the invention, an aircraft is provided with a longitudinally extending body portion or fuselage 10 having a forward control compartment 12 therein. Laterally extending wings are provided on each side of the body 10 and extend outwardly therefrom. Each of the wing constructions 14 and 16 is substantially rectangular in cross-section. They may preferably be square and they may have a bottom portion 20, a top portion 22, an inner side member 24 and an outer side member 26. The side members 24 and 26 are substantially plane surfaces, as is the bottom surface 20, but preferably the top surface 22 is arcuate. The bottom member 20 is considerably shorter than the top member 22 but terminates in substantially the same forward plane so that the top member 22 extends rearwardly beyond the bottom of the bottom member 20 so that the rear edge 36 of the side members 24 and 26 slope rearwardly and upwardly from the rear end of the bottom member 20 to the rear end of the top member 22. A suitable engine housing 28 is mounted in each of the wings 14 and 16 and has a propeller 30 thereon. It will be obvious that the operation of the motors encased in the housings 28 will cause rotation of the propellers 30 and the consequent flow of air through the tunnel-like wings. Air foils 32 are mounted on pivots 34 adjacent the rear end of the tunnel-like wings with the air foils 32 being spaced upwardly from each other and because of the rearward slant of the edge 36 of the wing members, the air foils are successively upwardly and rearwardly displaced from each other. Operating cranks 38 are fixed to each of the air foils 32 and the air foils are operatively connected together by means of a spacer rod 40. Since the wings 14 and 16 are substantially identical in construction, the description of a single wing will be sufficient to apply to both. In order to prevent forward escape of air past the propeller 30, shroud sections 42 may be placed in the corners of the tunnel-like wings and are preferably hinged adjacent the vertical edges thereof by means of suitable hinges 44. The hinge pins 44 are provided with segmental gears 46 and a control worm 48 driven by a motor 50 is placed in a housing 52 adjacent each of the shroud sections 42. In order to control the oppositely disposed air foils in the wings 14 and 16, an operating crank 56 is operatively connected to one of the air foils in each of the wings and an operating rod 58 is connected thereto. In order to control the operating rods 58 and 60, a yoke bar 62 is slidably mounted in tracks 64 and 66 in the body of the aircraft, and the rods 58 and 60 are connected adjacent to the opposite ends thereof. A threaded collar 68 is pivotally mounted to the bar 62 adjacent the central portion thereof and a control screw 70 is threadedly engaged therein. The control screw 70 is mounted in bearings 72 and 74 fixed in the body 10 of the aircraft and the rod 70 is held against sliding motion by means of the collars 76 and 78. A hand wheel 80 is provided with a shaft 82 which is connected to the screw 70 by means of a universal joint 84. It will thus be apparent that operation of the wheel 80 will rotate the screw 70 as may be desired. In order to permit turning of the vehicle, the guide channel 86 is arranged in longitudinal parallel relation to the screw 70 and a rock shaft 88 is mounted in the guide 86 and is secured to the yoke bar 62 by means of the U-shaped connector 90 which engages a peripheral groove 92 in the rock shaft 88. A rock lever 94 is connected on the rear of the rock shaft 88 and is connected adjacent the ends of the yoke bar 62 by means of the bridle members 96 and 98.

In the operation of the aircraft according to the invention, the propellers 30 cause a draft of air through the tunnel-like wings 16 and 14 and at low speeds, the motors 50 will be operated to close the shroud members 42 so that there will be no reverse flow of air past the propellers. For ascension of the aircraft, the hand wheel 80 will be turned to move the yoke bar 62 to a forward position so that the air foils 32 will be arranged in a substantially vertical position so that the down draft from the air foils will produce a lifting motion against the top 22 of the wings 14 and 16 and the reaction of the draft from the air foils 32 will cause a rapid ascent of the vehicle. For normal forward motion, the air foils 32 will be arranged in substantially horizontal parallel relation, and at high speeds, the air shrouds 42 will be retracted as shown in Figure 1 so that the flow of air through the tunnel-like wings will be in no wise diminished.

The angular position of the air foils 32 is controlled by means of the hand wheel 80 which may be rotated to shift the yoke bar 62 and with the lever 94 in vertical position, both the wings will operate simultaneously to produce lift or forward motion as may be desired. In order to produce a turning motion, the lever 94 is shifted to the side advancing one end of the rock bar 62 and moving the other end rearwardly so that the opposed air foils will assume a different position and thus cause rotary motion of the vehicle about its vertical axis.

It will thus be apparent that the present invention has provided a compact and easily controlled aircraft which will be capable of substantially vertical ascent or descent and which may be operated at various speeds and in which the control of flow through the tunnel-like wings may be readily determined.

While for purposes of exemplification, a particular embodiment of the invention has been shown and described according to the best present understanding thereof, it will be apparent to those skilled in the art that various changes and modifications may be made in the construction and arrangement of the parts thereof without departing from the true spirit and scope of the invention.

What is claimed as new is as follows:

An aircraft comprising a fuselage, wings on each side of the fuselage, each wing having a box-shaped tunnel-like structure with open front and rear ends and with an arcuate top portion and a substantially rectangular cross-section, the longitudinal extension of the wing at the bottom being shorter than the longitudinal extension of the top portion, the open front end being located in a plane perpendicular to the longitudinal axis of the airplane, and the rear open end being in a plane inclined with respect to the plane of the open front end surfaces, a propeller within the box-shaped wing structure substantially in closest proximity to the open front end of the box-shaped tunnel-like wing, shroud sections provided at the open front end of the tunnel-like wing covering the space surrounding the propeller between the circular area through which the propeller moves and the rectangular cross-section of the tunnel-like wing, a plurality of vertically spaced pivotally mounted airfoils, mounted in stair-step like manner, one foil above the other being at the rear of the other, said airfoils being essentially equidistant and leaving between them and the top and bottom ends channels of substantially equal width, means for connecting said airfoils and for adjusting the position of said airfoils relatively to the bottom and top portion of the wing to produce a variable deflection of the airstream produced by the propeller flowing through the tunnel-like wing, the shroud sections being hinged to the sides of the wings, and means for moving the shroud sections inwardly to a position of substantial parallelism with the walls of the tunnel-like wings.

References Cited in the file of this patent
UNITED STATES PATENTS

| | | |
|---|---|---|
| 1,533,222 | Cashman | Apr. 14, 1925 |
| 1,759,442 | Depew | May 20, 1930 |
| 1,771,230 | Pallavicino | July 22, 1930 |
| 1,890,059 | Lake | Dec. 6, 1932 |
| 1,910,098 | Ellis | May 23, 1933 |
| 2,118,052 | Odor | May 24, 1938 |
| 2,385,152 | Morrison | Sept. 18, 1945 |
| 2,746,674 | Alldritt | May 22, 1956 |

FOREIGN PATENTS

| | | |
|---|---|---|
| 558,943 | France | June 5, 1923 |
| 936,312 | France | Feb. 16, 1948 |